US008869880B2

(12) United States Patent  
McClanahan et al.

(10) Patent No.: US 8,869,880 B2  
(45) Date of Patent: Oct. 28, 2014

(54) SYSTEM FOR SUBSEA EXTRACTION OF GASEOUS MATERIALS FROM, AND PREVENTION, OF HYDRATES

(75) Inventors: Jack L. McClanahan, Montgomery, TX (US); Craig S. Tiras, Houston, TX (US); Jeff McClanahan, Houston, TX (US); Gaurav Dhingra, Spring, TX (US)

(73) Assignee: Gaumer Company, Inc., Houston, TX (US)

( * ) Notice: Subject to any disclaimer, the term of this patent is extended or adjusted under 35 U.S.C. 154(b) by 401 days.

(21) Appl. No.: 13/219,035

(22) Filed: Aug. 26, 2011

(65) Prior Publication Data

US 2012/0073823 A1 Mar. 29, 2012

Related U.S. Application Data

(63) Continuation-in-part of application No. 12/584,610, filed on Sep. 9, 2009, now Pat. No. 8,391,696, and a continuation-in-part of application No. 12/584,626, filed on Sep. 9, 2009, now Pat. No. 8,521,014, and a continuation-in-part of application No. 12/584,640, filed on Sep. 9, 2009, now Pat. No. 8,295,692, and a continuation-in-part of application No. 12/399,811, filed on Mar. 6, 2009, now Pat. No. 8,103,156, and a continuation-in-part of application No. 12/029,957, filed on Feb. 12, 2008, now abandoned.

(60) Provisional application No. 60/889,324, filed on Feb. 12, 2007.

(51) Int. Cl.
*E21B 36/00* (2006.01)
*E21B 36/04* (2006.01)
*F02M 21/00* (2006.01)
*E21B 43/01* (2006.01)
*B01D 19/00* (2006.01)

(52) U.S. Cl.
CPC ......... *B01D 19/0073* (2013.01); *F02M 21/00* (2013.01); *E21B 43/0122* (2013.01); *E21B 36/04* (2013.01); *E21B 2043/0115* (2013.01)
USPC ............... 166/57; 166/60; 166/302; 219/385; 219/482; 219/490; 219/494; 392/465; 392/485; 392/487

(58) Field of Classification Search
USPC ............... 166/57, 60, 302; 219/201, 213, 385, 219/386, 387, 482, 490, 494; 392/465, 485, 392/487
See application file for complete search history.

(56) References Cited

U.S. PATENT DOCUMENTS

| | | |
|---|---|---|
| 1,098,573 A | 6/1914 | Hauser |
| 3,726,713 A | 4/1973 | Hawk et al. |
| 3,871,734 A | 3/1975 | Murtland |
| 4,163,371 A | 8/1979 | Groninger |
| 4,318,442 A | 3/1982 | Lunde et al. |

(Continued)

OTHER PUBLICATIONS

PCT Int'l Search Report and Written Opinion (PCT/US2012/052562), dated Feb. 20, 2013.

(Continued)

*Primary Examiner* — Robert Clemente
(74) *Attorney, Agent, or Firm* — Bracewell & Giuliani LLP

(57) ABSTRACT

A system for subsea extraction of gaseous materials from and preventing the formation of hydrates.

25 Claims, 14 Drawing Sheets

(56) References Cited

U.S. PATENT DOCUMENTS

| | | |
|---|---|---|
| 4,358,218 A | 11/1982 | Graham |
| 4,781,607 A | 11/1988 | Rumbaugh |
| 4,895,528 A | 1/1990 | Choiniere et al. |
| 5,070,940 A | 12/1991 | Conner et al. |
| 5,216,743 A | 6/1993 | Seitz |
| 5,396,574 A | 3/1995 | Base et al. |
| 5,483,040 A | 1/1996 | Fortune |
| 5,577,925 A | 11/1996 | Schnatzmeyer et al. |
| 5,590,240 A | 12/1996 | Rezabek |
| 6,009,940 A * | 1/2000 | Eck et al. ............ 166/60 |
| 6,145,597 A | 11/2000 | Kobylinski |
| 6,364,933 B1 | 4/2002 | Heath |
| 6,551,379 B2 | 4/2003 | Heath |
| 6,592,641 B2 | 7/2003 | Alvin et al. |
| 6,816,669 B2 | 11/2004 | Zimmer et al. |
| 6,972,841 B2 | 12/2005 | Krempl et al. |
| 6,994,159 B2 | 2/2006 | Wendland |
| 6,994,589 B2 | 2/2006 | Schliese |
| 7,145,114 B2 | 12/2006 | Wakamatu et al. |
| 7,164,851 B2 | 1/2007 | Sturm et al. |
| 7,204,724 B2 | 4/2007 | Holtze |
| 7,318,735 B2 | 1/2008 | Fannin et al. |
| 7,372,007 B1 | 5/2008 | McClanahan et al. |
| 7,442,239 B2 | 10/2008 | Armstrong et al. |
| 7,554,064 B1 | 6/2009 | Fannin et al. |
| 7,616,873 B1 | 11/2009 | Seitz |
| 2009/0217581 A1 | 9/2009 | McClanahan et al. |
| 2010/0050518 A1 | 3/2010 | McClanahan et al. |
| 2010/0051279 A1 | 3/2010 | Baugh et al. |
| 2010/0058761 A1 | 3/2010 | McClanahan et al. |
| 2010/0059121 A1 | 3/2010 | McClanahan et al. |
| 2010/0061710 A1 | 3/2010 | McClanahan et al. |
| 2010/0170210 A1 | 7/2010 | McClanahan et al. |
| 2011/0116777 A1 | 5/2011 | Tiras |
| 2011/0139765 A1 | 6/2011 | McClanahan et al. |
| 2011/0168691 A1 | 7/2011 | McClanahan et al. |
| 2012/0141213 A1 * | 6/2012 | Merritt ............ 405/210 |

OTHER PUBLICATIONS

U.S. Appl. No. 13/217,807, filed Aug. 25, 2011—Fuel Gas Conditioning System.

* cited by examiner

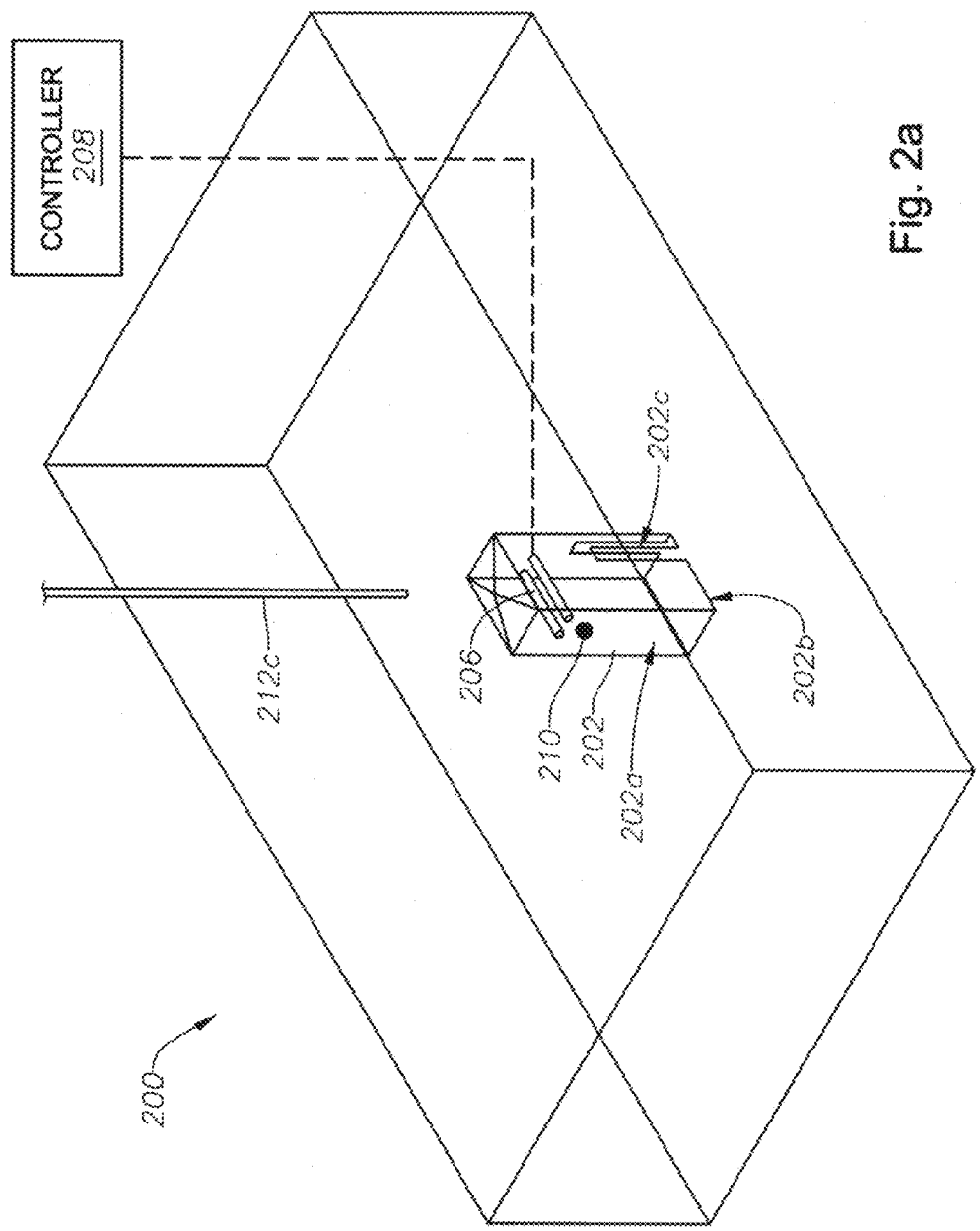

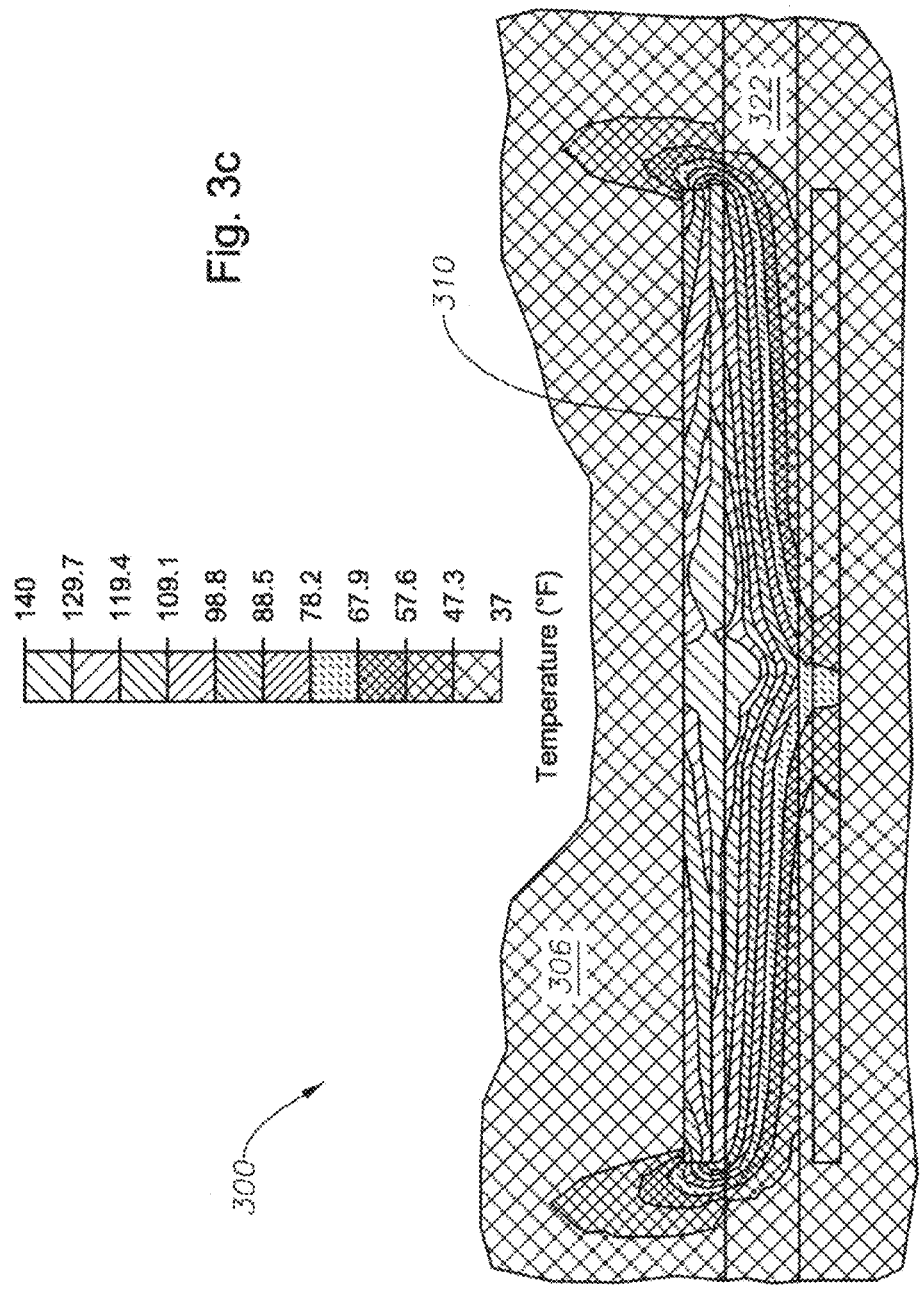

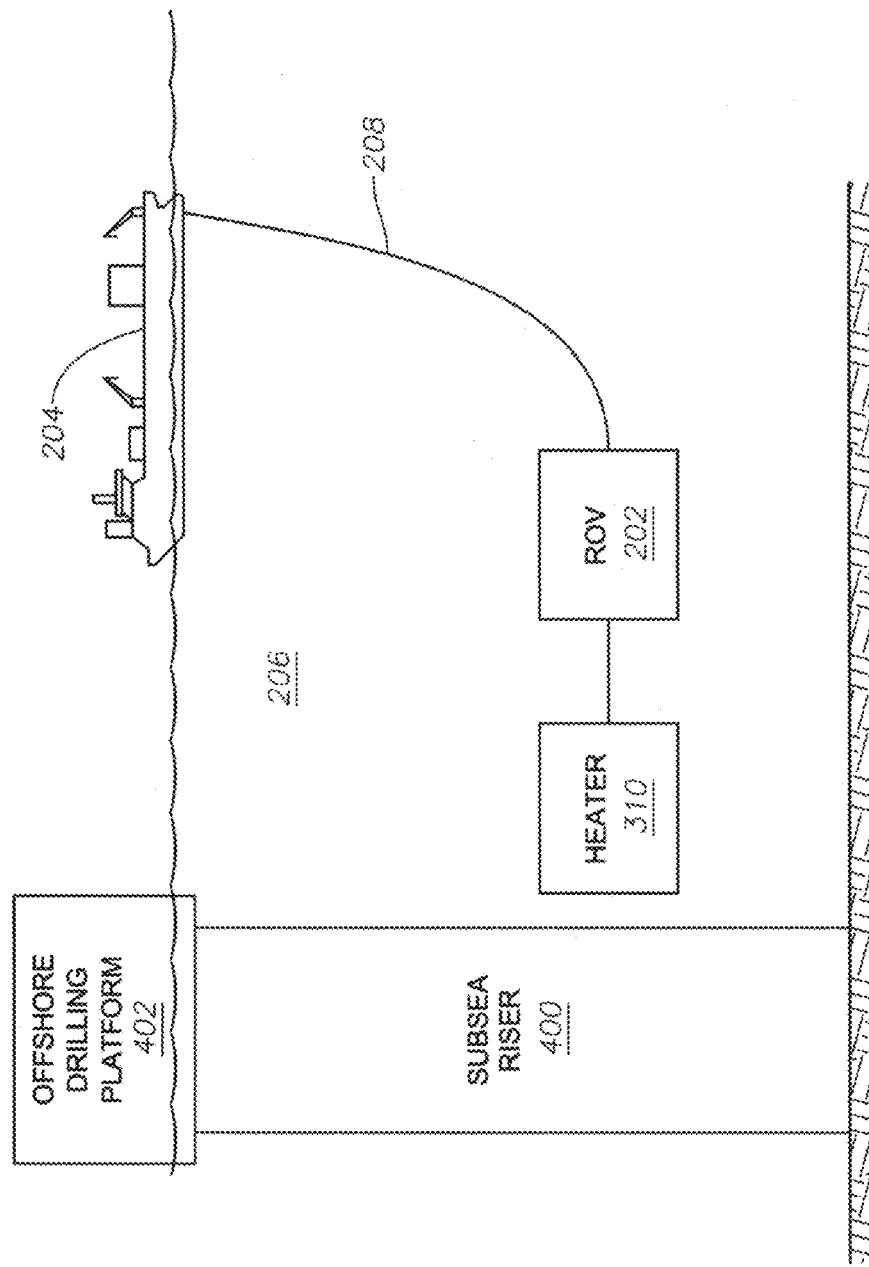

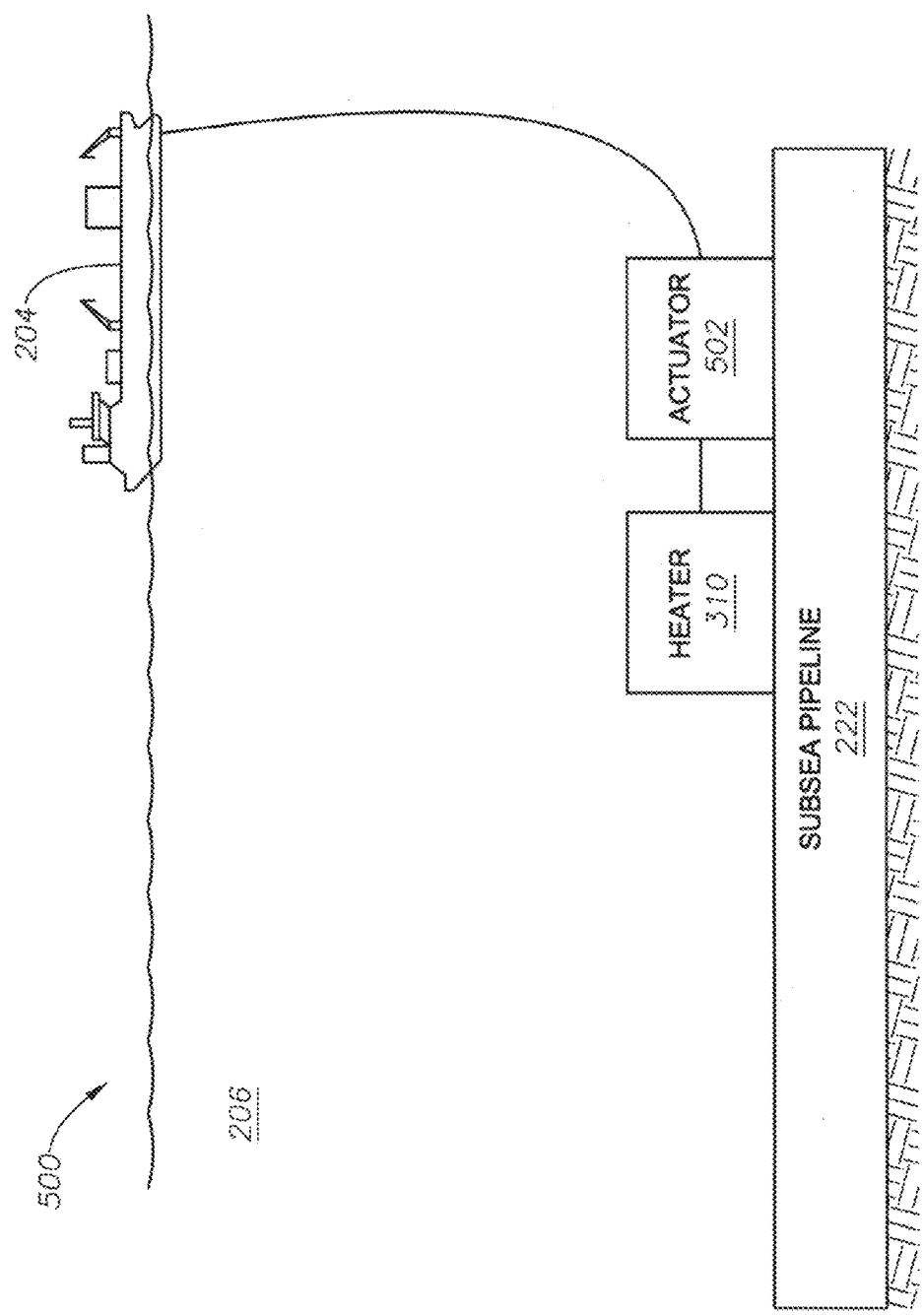

SYSTEM FOR SUBSEA EXTRACTION OF GASEOUS MATERIALS FROM, AND PREVENTION, OF HYDRATES

CROSS REFERENCE TO RELATED APPLICATIONS

This application is a continuation in part of U.S. utility patent application Ser. Nos. 12/584,610, 12/584,626 and 12/584,640, filed on Sep. 9, 2009, Sep. 9, 2009 and Sep. 9, 2009, respectively, which were continuations in part of U.S. utility patent application Ser. No. 12/399,811, filed on Mar. 6, 2009, which was a continuation in part of U.S. utility patent application Ser. No. 12/029,957, filed on Feb. 12, 2008, which claimed priority to U.S. provisional patent application Ser. No. 60/889,324, filed on Feb. 12, 2007, the disclosures of which are incorporated herein by reference.

FIELD OF THE INVENTION

The field of this invention is that of preventing hydrate blockages in subsea pipelines, subsea riser pipes, and subsea equipment installations.

BACKGROUND OF THE INVENTION

Hydrates are a porous solid which is formed primarily of water with a mixture of gases. It is effectively similar to crushed ice which is stuck together. There is a tendency for hydrates to form in pipelines departing from a subsea gas well, especially during well flow startup.

The temperature of the seawater at depths will often approach 34° F., with the temperature in a non-blowing pipe being the same. When a subsea valve is opened, the gas expansion can cause substantial additional cooling. In these cold and high pressure conditions, hydrates of the gas and water quickly form.

Frequently when the hydrate forms, it forms a blockage. The blockage will typically be somewhat porous. At that time, a high pressure will exist on the upstream side of the blockage and a lower pressure will exist on the downstream side. This means that additional gas will move thru the hydrate and expand and therefore cool as it does. This means that not only can the expansion of this gas keep the formed hydrate cool, but can literally continue to grow additional hydrate blockage.

Attempts have been made to enter the accessible end of the pipeline with a somewhat flexible string of steel coiled tubing to get to the blockage and wash it out. This is an expensive operation due to the cost of the equipment and the time delay in arranging for and deploying the equipment. As the blockage most often occurs at the opposite end from the accessible end, the blockage can be 5 or more miles away. Removal by the use of coiled tubing is further complicated if there are bends in the pipeline, making it more difficult to impossible.

Another method of prevention of the formation of hydrates is to place expensive, environmentally harmful chemicals at the likely location of the formation of the hydrates. Chemicals such as methanol will reduce the temperature of the liquid/gas combination required for the formation of the hydrates, hopefully below the temperature which occurs during the well startup operations. In addition to the chemicals being expensive, the delivery of the chemicals to the remote location of the likely hydrate formation requires expensive capital equipment, and the cost of remediation of the chemicals is costly in some cases.

The patent or application file contains at least one drawing executed in color. Copies of this patent or patent application publication with color drawing(s) will be provided by the Office upon request and payment of the necessary fee.

BRIEF DESCRIPTION OF THE DRAWINGS

The patent or applicaton file contains at least one drawing executed in color. Copies of this patent or patent application publication with color drawing(s) will be provided by the Office upon request and payment of the necessary fee.

FIG. 2a is a perspective illustration of an exemplary embodiment of a system for subsea extraction of gaseous materials from and prevention of hydrates.

FIGS. 3b and 3c are graphical illustrations of exemplary experimental embodiments of the system of FIGS. 3 and 3a.

FIG. 4 is a schematic illustration of an exemplary embodiment of a system for subsea prevention of hydrates within a subsea riser.

FIG. 5 is a schematic illustration of an exemplary embodiment of a system for subsea prevention of hydrates within a subsea pipeline.

DETAILED DESCRIPTION OF THE INVENTION

Figure 1:
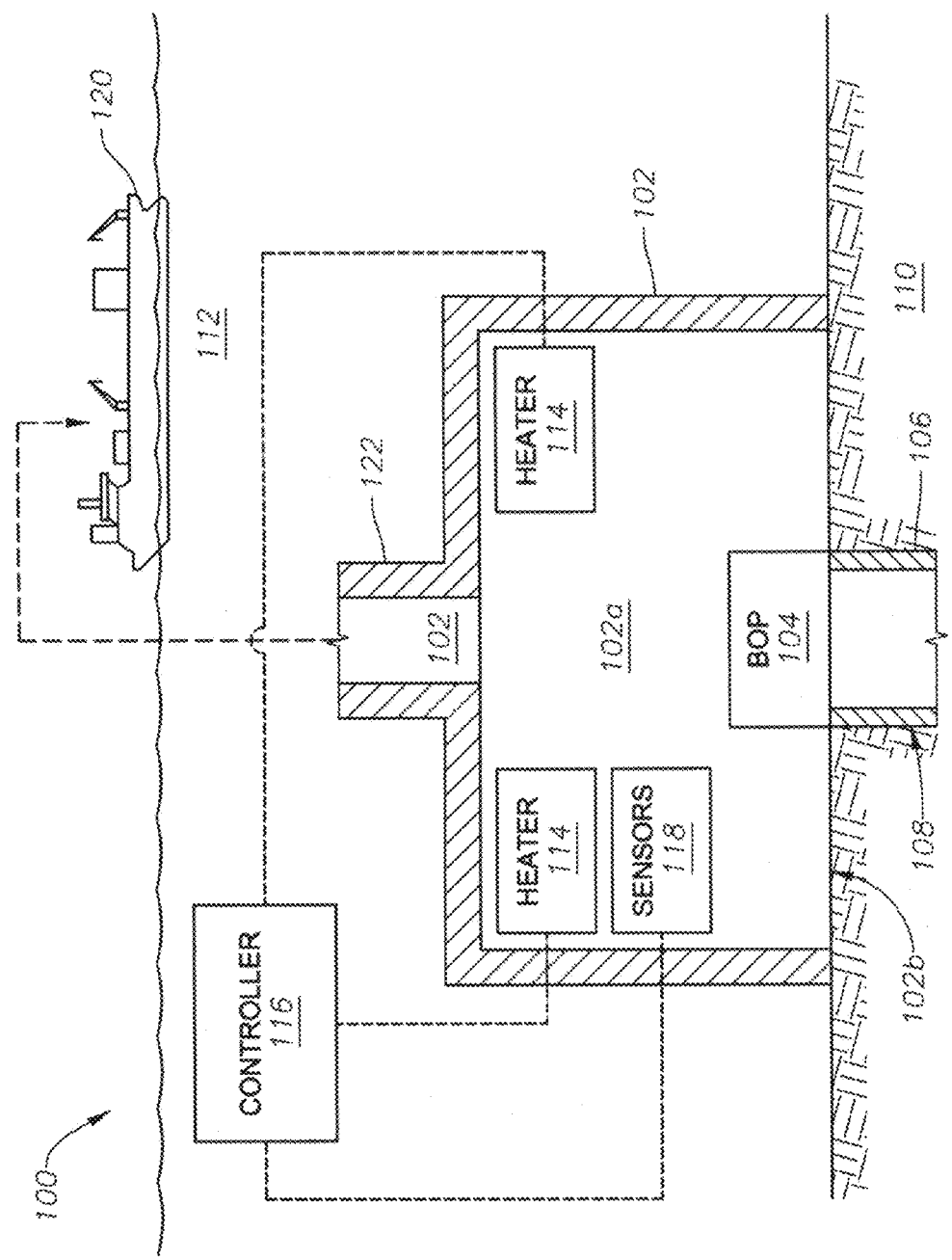
FIG. 1 is a schematic illustration of an exemplary embodiment of a system for subsea extraction of gaseous materials from and prevention of hydrates.

Referring to FIG. 1, an exemplary embodiment of a system 100 for extracting gaseous materials from hydrates at a subsea location includes a containment housing 102 that defines an inner chamber 102a and includes an open end 102b and one or more passages 102c. In an exemplary embodiment, the volume of the chamber 102a and the cross section of the open end 102b of the containment housing 102 are large enough to permit the open end of the containment housing to be positioned over and receive a blow out preventor ("BOP") 104 of a wellhead 106 of a wellbore 108 that traverses a subterranean formation 110 below a body 112 of water. In other embodiments, the volume of the chamber 102a and the cross section of the open end 102b of the containment housing 102 are large enough to permit the open end of the containment housing to be positioned over a subsea leak source such as, but not limited to, a riser pipe leak, a production tieback leak, and a pipeline leak.

In an exemplary embodiment, one or more heaters 114 are supported within the chamber 102a of the housing 102 that are also operably coupled to a controller 116 for monitoring and controlling the operation of the heaters. One or more sensors 118 are also supported within and operable coupled to the chamber 102a of the housing 102 and operably coupled to the controller 116 for transmitting signals to the controller that are representative of one or more operating conditions within the chamber of the housing.

In an exemplary embodiment, one or more of the passages 102c of the housing 102 are operably coupled to a collection device 120 such as, for example, an oil tanker positioned on the surface of the body 112 of water. In this manner, hydrocarbons and other materials contained within the housing 102, which may also include gaseous materials contained within hydrates, may be collected for further processing.

In an exemplary embodiment, one or more of the heaters 114 are 1.25 MW and 4 kV heaters that are commercially available from Gaumer Process of Houston, Tex. In an exemplary embodiment, one or more of the heaters 114 are provided and operate substantially as described in U.S. Pat. No. 7,372,007, the disclosure of which is incorporated herein by reference. In an exemplary embodiment, one or more of the heaters 114 include a plurality of one or more of the 1.25 MW and 4 kV heaters that are commercially available from Gaumer Process of Houston, Tex. and/or heaters provided substantially as described in U.S. Pat. No. 7,372,007. In an exemplary embodiment, one or more of the heaters 114 may be oriented in a direction that is substantially vertical with respect to the sea floor below the body 112 of water in order to enhance the transfer of thermal energy from the heaters to the materials within the chamber 102a of the housing 102.

In an exemplary embodiment, during operation of the system 100, the housing 102 is positioned over the BOP 104. Once the housing 102 has been positioned, one or more of the heaters 114 may, be operated to heat the materials within and proximate to the chamber 102a of the housing. In an exemplary embodiment, in this manner, gaseous materials contained within hydrate materials within and proximate to the chamber 102a of the housing may thereby be heated sufficiently to release at least a portion of the gaseous compounds contained therein. As a result, the gaseous compounds released may be contained within the chamber 102a of the housing for subsequent transmission out of the chamber of the housing through the passage 102c of the housing for collection by the collection device 120.

In an exemplary embodiment, during operation of the system 100, the chamber 102a of the housing 102 is heated sufficiently by operation of the heaters 114 to prevent the formation of hydrates within and proximate to the chamber of the housing. In this manner, hydrate formation may be prevented thereby facilitating the safe and efficient transmission of hydrocarbons and other materials out of the chamber 102a of the housing 102 through the passage 102c of the housing for collection by the collection device 120.

In an exemplary embodiment, because one or more of the heaters 114 operate with three-phase AC power in the range of about 2 kV to about 5 kV. As a result, when the system 100 is used in a subsea environment, the potential transmission line losses are reduced thereby permitting efficient and effective heating of materials within the chamber 102a of the housing 102. For example, lower operating voltage heaters, typically having operating voltages up to about 690 volts are unsuitable for subsea operations as their transmission line losses are significant. By comparison, the heaters 114 of the system 100 can efficiently and effectively heat materials within and proximate the chamber 102a of the housing 102 at depths up to and exceeding one mile in depth.

In an exemplary embodiment, a conduit 122 is coupled to the housing 102 for conveying materials from the interior of the chamber 102a of the housing to the collection device 120. In an exemplary embodiment, the conduit 122 may be a riser and the collection device 120 may be an oil rig operably coupled to the riser. In an exemplary embodiment, the conduit 122 may be the outer pipe of a dual walled undersea pipeline used for conveying materials from the wellhead 106 of the wellbore 108 to an offshore and/or onshore storage and/or distribution system. In an exemplary embodiment, the housing 102 may be positioned over a portion of the sea bottom that does not includes a BOP 104 or a wellbore 108 to thereby permit the system 100 to vacuum gaseous materials from hydrate materials within the seabed below or proximate to the housing 102. In this manner, the teachings of the system 100 may be used to prevent and/or eliminate the formation of hydrates during the exploration and production of hydrocarbon materials from a subsea oil well. Furthermore, in this manner, the teachings of the system 100 may be used to extract gaseous materials from hydrate's during the exploration and production of hydrocarbon materials from a subsea oil well.

In an exemplary experimental embodiment, a computer simulation of the system 100 was implemented that is representative of the actual operation of the system 100. In the computer simulation, a mixture of sea water and natural gas was heated within the chamber 102a of the housing 102. In the exemplary experimental embodiment, the sea water was provided at an operating temperature of 35° F., an operating pressure of 2200 psig and a mass flow rate of 5000 lb/hour. In the exemplary experimental embodiment, the natural gas was provided at an operating temperature of 34.93° F., an operating pressure of 2200 psig and flow rate of 22.53 million standard cubic feet per day ("MMSCFD"). In the exemplary experimental embodiment, the heaters 114 heated the mixture of sea water and natural gas from a feed temperature of 34.93° F. to an operating temperature of 84.93° F.

Figure 2B:
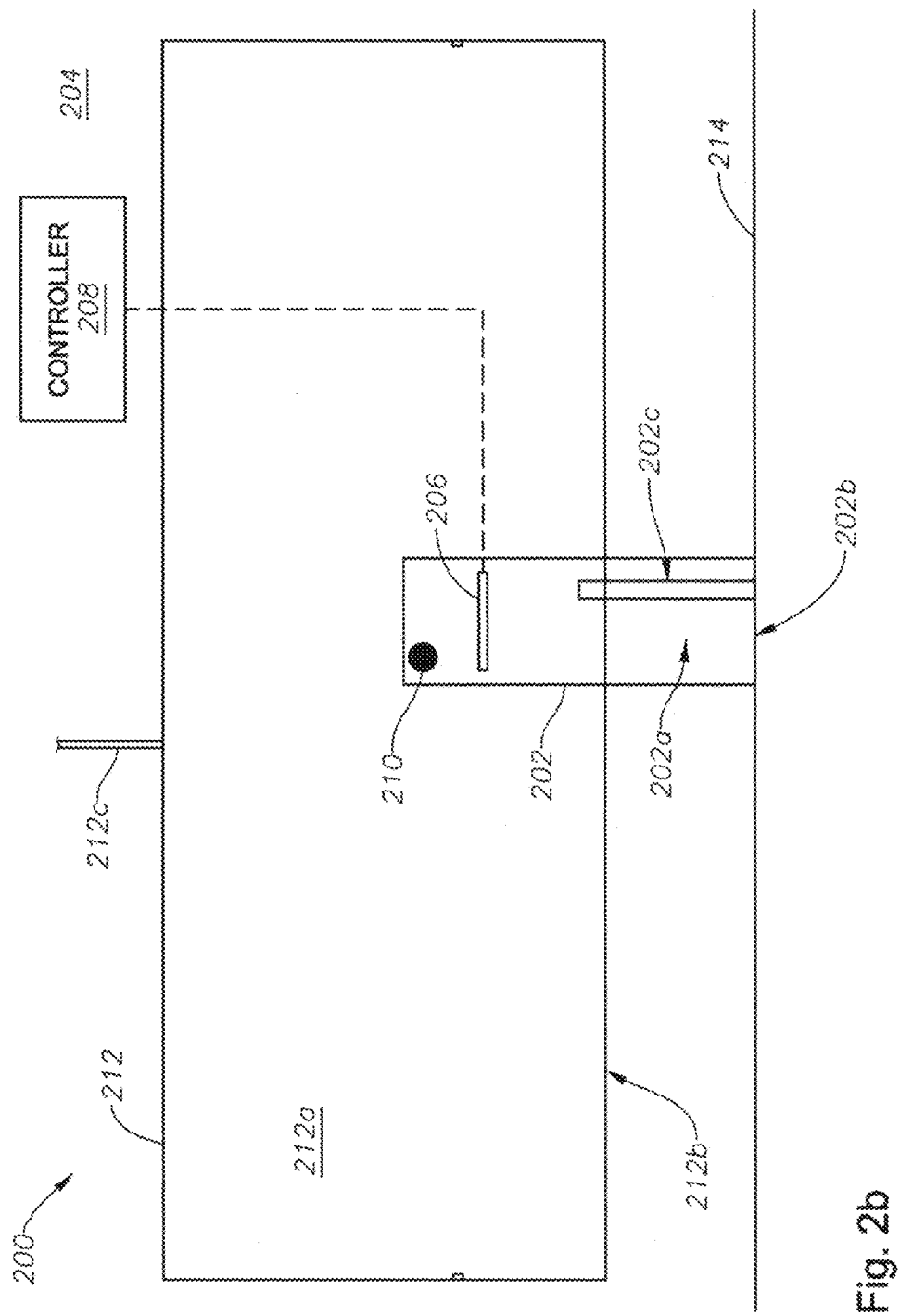
FIG. 2b is an illustration of an exemplary embodiment of a system for subsea extraction of gaseous materials from and prevention of hydrates.

Referring now to FIGS. 2a and 2b, an exemplary embodiment of a system 200 for extracting gaseous materials from hydrates at a subsea location includes a containment housing 202 that defines an inner chamber 202a and includes an open end 202b, and one or more side passages 202c. In an exemplary embodiment, the volume of the chamber 202a and the cross section of the open end 202b of the containment housing 202 are large enough to permit the open end of the containment housing to be positioned over and receive a blow out preventor of a wellhead of a wellbore that traverses a subterranean formation below a body 204 of water. In other embodiments, the volume of the chamber 202a and the cross section of the open end 202b of the containment housing 202 are large enough to permit the open end of the containment housing to be positioned over a subsea leak source such as, but not limited to, a riser pipe leak, a production tieback leak, and a pipeline leak.

In an exemplary embodiment, one or more heaters 206 are supported within the chamber 202a of the housing 202 that are also operably coupled to a controller 208 for monitoring and controlling the operation of the heaters. One or more sensors 210 are also supported within and operable coupled to the chamber 202a of the housing 202 and operably coupled to the controller 208 for transmitting signals to the controller that are representative of one or more operating conditions within the chamber of the housing.

In an exemplary embodiment, one or more of the heaters 206 are 1.25 MW and 4 kV heaters that are commercially available from Gaumer Process of Houston, Tex. In an exemplary embodiment, one or more of the heaters 206 are provided and operate substantially as described in U.S. Pat. No. 7,372,007, the disclosure of which is incorporated herein by reference. In an exemplary embodiment, one or more of the heaters 206 include a plurality of one or more of the 1.25 MW and 4 kV heaters that are commercially available from Gaumer Process of Houston, Tex. and/or heaters provided substantially as described in U.S. Pat. No. 7,372,007. In an exemplary embodiment, one or more of the heaters 206 may be oriented in a direction that is substantially vertical with respect to the sea floor below the body 204 of water in order to enhance the transfer of thermal energy from the heaters to the materials within the chamber 202a of the housing 202.

A cofferdam 212 that defines an inner chamber 212a and includes an open end 212b is positioned over and at least partially receives the housing 202. In an exemplary embodiment, one or more conduits 212c are operably coupled to the chamber 212a of the cofferdam 212 for conveying fluidic materials therefrom to a collection device such as, for example, an oil tanker positioned on the surface of the body 204 of water. In this manner, hydrocarbons and other materials contained within the cofferdam 212, which may also include gaseous materials contained within hydrates, may be collected for further processing.

In an exemplary embodiment, during operation of the system 200, the housing 202 is positioned over a BOP. Once the housing 202 have been positioned, one or more of the heaters 206 may be operated to heat the materials within and proximate to the chamber 202a of the housing, during which the cofferdam 212 is positioned at least partially over the housing 202 with the open end portions 212b of the cofferdam spaced above the sea floor 214. In an exemplary embodiment, in this manner, gaseous materials contained within hydrate materials within and proximate to the chamber 202a of the housing may thereby be heated sufficiently to release at least a portion of the gaseous compounds contained therein. As a result, the gaseous compounds released may be contained within the chamber 212a of the cofferdam 212 for subsequent transmission out of the chamber of the cofferdam through the passage 212c of the cofferdam for collection by a subsurface and/or surface collection device.

In an exemplary embodiment, during operation of the system 200, the chamber 202a of the housing 202 is heated sufficiently by operation of the heaters 206 to prevent the formation of hydrates within and proximate to the chamber of the housing and within the chamber 212a of the cofferdam. In this manner, hydrate formation may be prevented thereby facilitating the safe and efficient transmission of hydrocarbons and other materials out of the chamber 212a of the cofferdam 212 through the passage 212c of the cofferdam for collection by a subsurface and/or surface collection device.

In an exemplary embodiment, because one or more of the heaters 206 operate with three-phase AC power in the range of about 2 kV to about 5 kV. As a result, when the system 200 is used in a subsea environment, the potential transmission line losses are reduced thereby permitting efficient and effective heating of materials within the chamber 202a of the housing 202. For example, lower operating voltage heaters, typically having operating voltages up to about 690 volts are unsuitable for subsea operations as their transmission line losses are significant. By comparison, the heaters 206 of the system 200 can efficiently and effectively heat materials within and proximate the chamber 202a of the housing 202 at depths up to and exceeding one mile in depth. For example, a Gaumer hydrotested subsea heater have been tested at 12,500 foot equivalent conditions.

In an exemplary embodiment, the conduit 212c may be a riser and the collection device may be an oil rig operably coupled to the riser. In an exemplary embodiment, the conduit 212c may be the outer pipe of a dual walled undersea pipeline used for conveying materials from the wellhead of the wellbore to an offshore and/or onshore storage and/or distribution system. In an exemplary embodiment, the housing 202 and cofferdam 212 may be positioned over a portion of the sea bottom that does not include a BOP or a wellbore to thereby permit the system 200 to vacuum gaseous materials from hydrate materials within the seabed below or proximate to the housing 202 and cofferdam 212. In this manner, the teachings of the system 200 may be used to prevent and/or eliminate the formation of hydrates during the exploration and production of hydrocarbon materials from a subsea oil well. Furthermore, in this manner, the teachings of the system 200 may be used to extract gaseous materials from hydrates during the exploration and production of hydrocarbon materials from a subsea oil well.

Figure 2C:
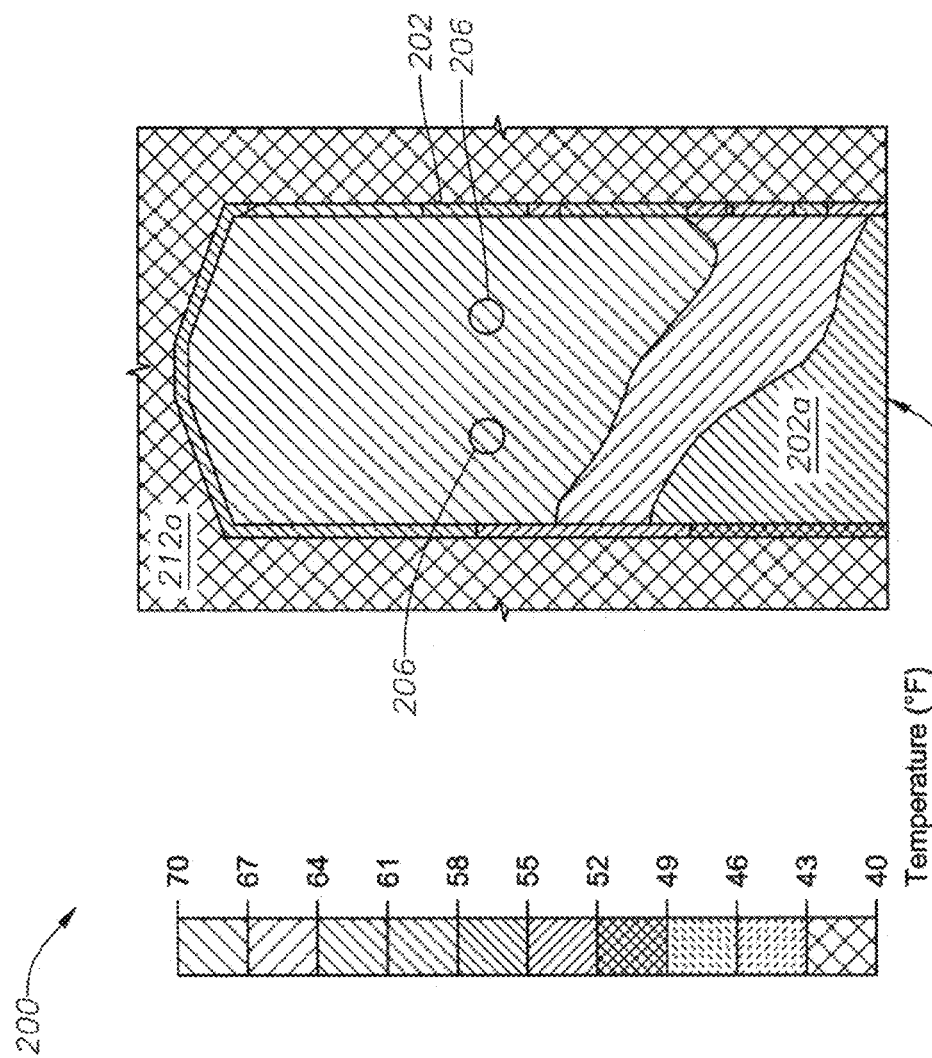
FIG. 2c is a graphical illustration of an exemplary experimental embodiment of the system of FIGS. 2a and 2b.
Figure 2D:
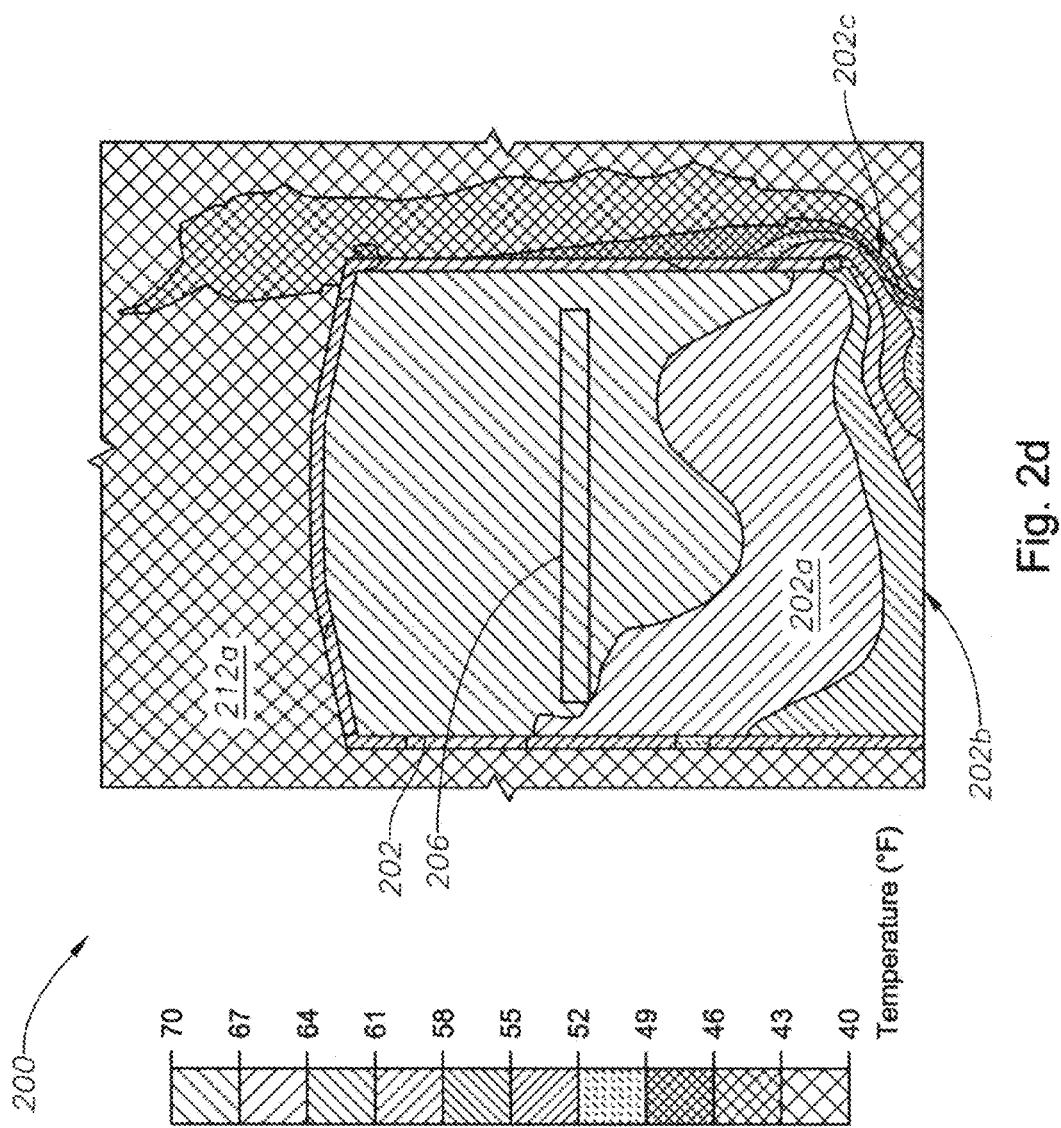
FIG. 2d is a graphical illustration of an exemplary experimental embodiment of the system of FIGS. 2a and 2b.

Referring now to FIGS. 2c and 2d, in an exemplary experimental embodiment of the system 200, a numerical model of the system was created that is predictive of actual operation of the system. In the exemplary experimental embodiment, the initial operating temperature of the chambers, 202a and 212a, were 40° F., as would be expected at a deep subsea depth of about 5,000 to 10,000 feet. As illustrated in FIG. 2d, in the exemplary experimental embodiment, fluidic materials within the chamber 202a of the housing 202 were heated sufficiently by the heaters 206 provided within the chamber to also heat fluidic materials within the chamber 212a of the cofferdam 212. In particular, as illustrated in FIG. 2d, fluidic materials within the chamber 202a were heated and the heated fluidic materials then passed out of the housing through the passages 202c in to the chamber 212a of the cofferdam 212. As a result, the exemplary experimental results demonstrated that hydrates may be dissolved and/or prevented from forming at deep subsea locations by operation of the system 200. This was an unexpected result.

Figure 3:
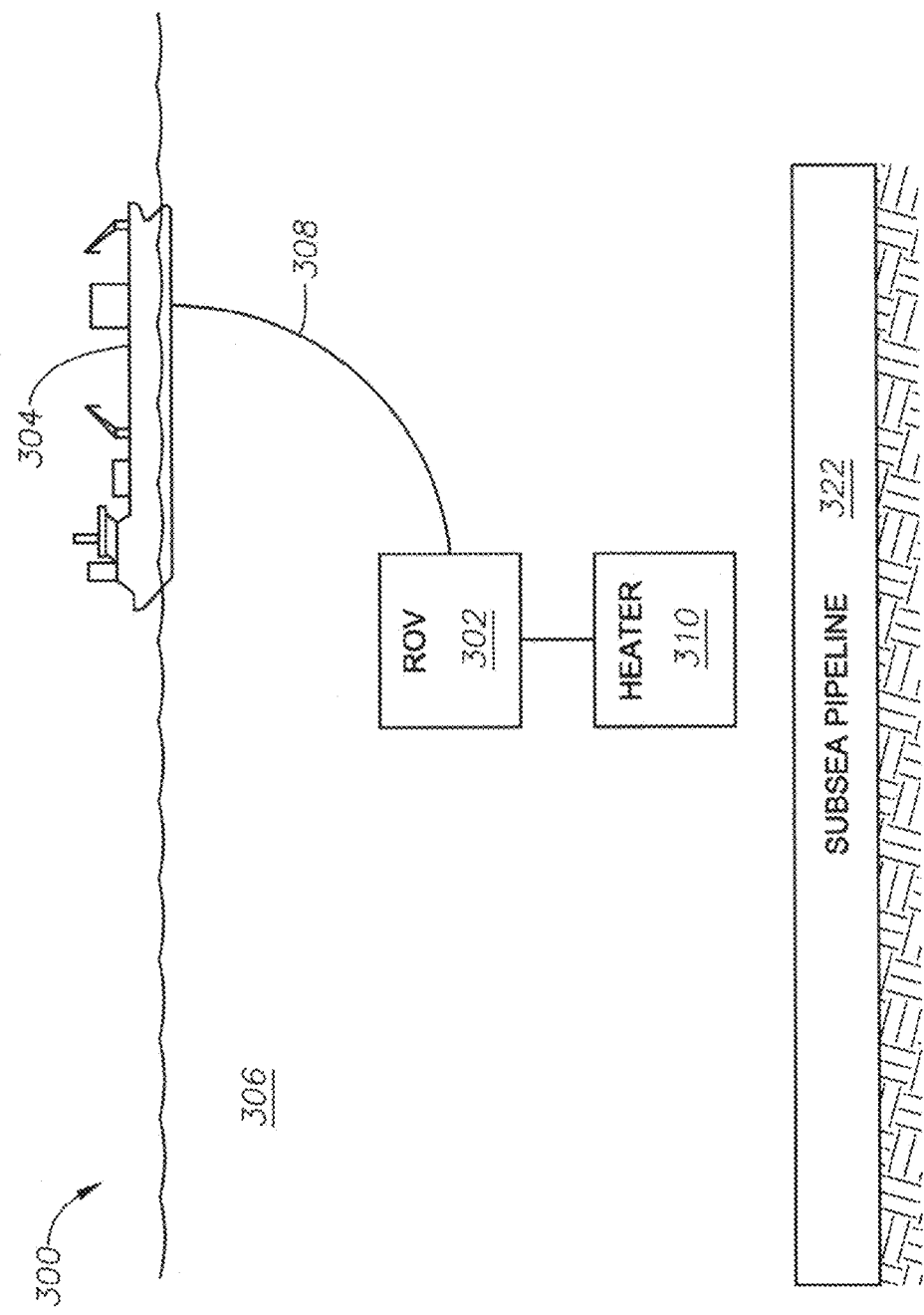
FIG. 3 is a schematic illustration of an exemplary embodiment of a system for subsea prevention of hydrates within a subsea pipeline.
Figure 3A:
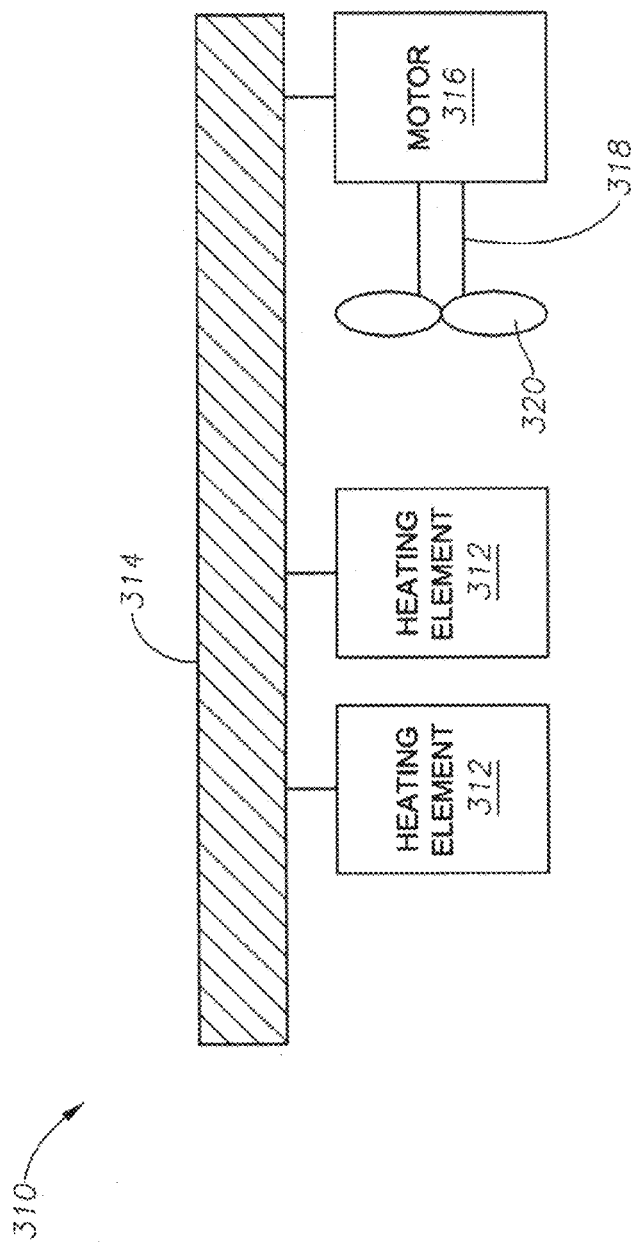
FIG. 3a is a schematic illustration of an exemplary embodiment of a system for subsea prevention of hydrates within a subsea pipeline.

Referring now to FIGS. 3 and 3a, an exemplary embodiment of a system 300 for preventing and/or removing hydrates includes a conventional remotely operated vehicle ("ROV") 302 that is operably coupled to a surface ship 304, or other controller, which may be may not be on the surface of a body of water 306, for example, by a conventional tether 308. The ROV 302 is capable of movement within the body of water 306, either autonomously, or by remote control from the ship 304. A heater 310 is coupled to the ROV 302 for heating fluidic materials within the body of water 306 proximate the ROV.

In an exemplary embodiment, the heater 310 includes one or more heating elements 312 coupled to a common housing 314. A motor 316 having an output shaft 318 and a propeller 320 may also be operably coupled to the housing 314 to facilitate heating of fluidic materials by operation of the heating elements 312 by directing fluidic materials over the heating elements.

In an exemplary embodiment, one or more of the heating elements 312 are 1.25 MW and 4 kV heaters that are commercially available from Gaumer Process of Houston, Tex. In an exemplary embodiment, one or more of the heating elements 312 are provided and operate substantially as described in U.S. Pat. No. 7,372,007, the disclosure of which is incorporated herein by reference. In an exemplary embodiment, one or more of the heating elements 312 include a plurality of one or more of the 1.25 MW and 4 kV heaters that are commercially available from Gaumer Process of Houston, Tex. and/or heaters provided substantially as described in U.S. Pat. No. 7,372,007.

In an exemplary embodiment, during the operation of the system 300, the ROV 302 is operated, as necessary, to position the heater 310 proximate a subsea pipeline 322. Once the ROV 302 has positioned the heater 310 proximate the subsea pipeline 322, the heater may then be operated to heat the fluidic materials within the body of water 306 proximate the subsea pipeline. In this manner, hydrates that may have formed within the interior of the subsea pipeline 322 may be heated sufficiently to cause their removal from the interior of the subsea pipeline.

Figure 3B:
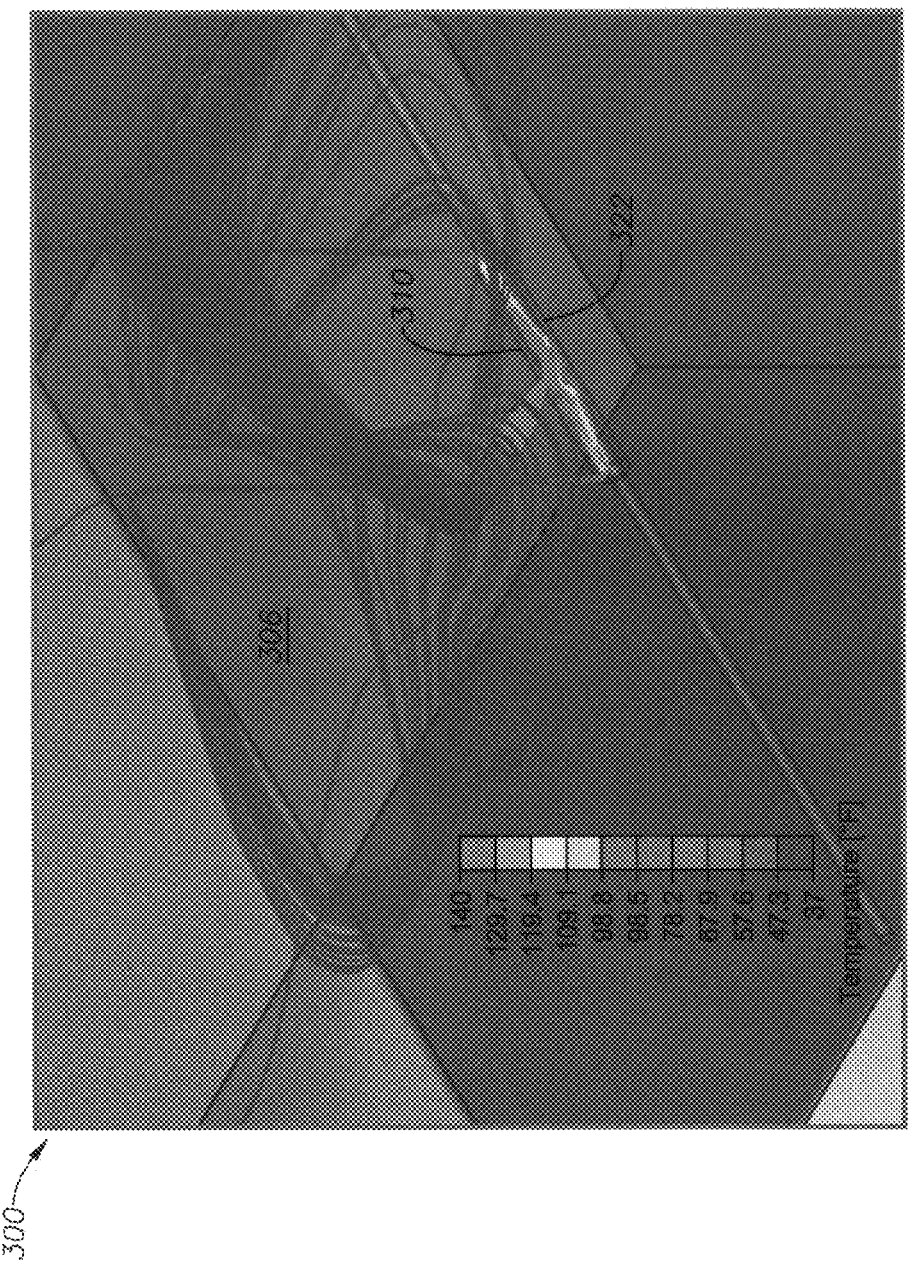

Referring now to FIGS. 3b and 3c, in an exemplary experimental embodiment of the system 300, a numerical model of the system was created that is predictive of actual operation of the system. In the exemplary experimental embodiment, the initial operating temperature of the fluidic material within the subsea pipeline 322 was 40° F., as would be expected at a deep subsea depth of about 5,000 to 12,500 feet. As illustrated in FIGS. 3b and 3c, in the exemplary experimental embodiment, fluidic materials within the subsea pipeline 322 were heated sufficiently by the heater 310 positioned within the body of water 306 proximate the subsea pipeline heat fluidic materials within the subsea pipeline sufficiently to dissolve and/or prevent the formation of hydrates therein. This was an unexpected result.

Referring now to FIG. 4, in an exemplary embodiment, during the operation of the system 200, the ROV 202 is operated, as necessary, to position the heater 310 proximate a subsea riser 400 for an offshore drilling platform 402. Once the ROV 202 has positioned the heater 310 proximate the subsea riser 400, the heater may then be operated to heat the fluidic materials within the body of water 206 proximate the subsea riser. In this manner, hydrates that may have formed within the interior of the subsea riser 400 may be heated sufficiently to cause their removal from the interior of the subsea riser.

Referring now to FIG. 5, an exemplary embodiment of a system 500 for preventing and/or removing hydrates includes a conventional remotely actuator 502 that is operably coupled to the subsea pipeline 222 for movement along and relative thereto. In an exemplary embodiment, the actuator 502 may, for example, include a tractor, an ROV or another equivalent device. In an exemplary embodiment, the actuator 502 is capable of movement along the subsea pipeline 222, either autonomously, or by remote control from the ship 204. The heater 310 is coupled to the actuator 502 for heating fluidic materials within the body of water 206 proximate the heater.

In an exemplary embodiment, during the operation of the system 500, the actuator 502 is operated, as necessary, to position the heater 310 proximate a desired location along the subsea pipeline 222. Once the actuator 502 has positioned the heater 310 at the desired location along the subsea pipeline 222, the heater may then be operated to heat the fluidic materials within the body of water 206 proximate the subsea pipeline. In this manner, hydrates that may have formed within the interior of the subsea pipeline 222 at the desired location may be heated sufficiently to cause their removal from the interior of the subsea pipeline. Thus, the system 500 may continually move along the subsea pipeline 222, as needed, to prevent and/or eliminate the formation of hydrates within the subsea pipeline.

Figure 6:
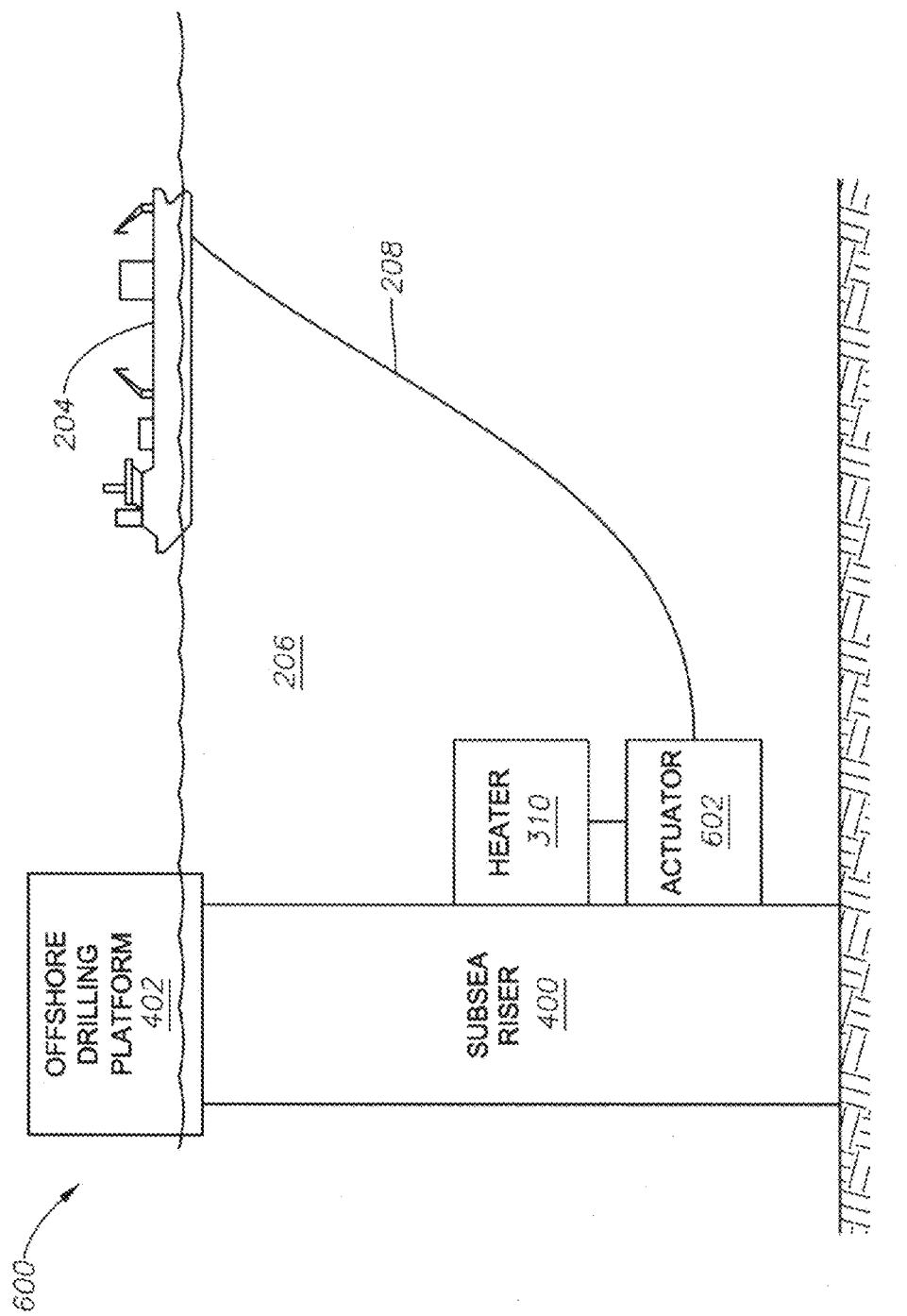
FIG. 6 is a schematic illustration of an exemplary embodiment of a system for subsea prevention of hydrates within a subsea riser.

Referring now to FIG. 6, an exemplary embodiment of a system 600 for preventing and/or removing hydrates includes the conventional remotely actuator 602 that is operably coupled to the subsea riser 400 for movement along and relative thereto. In an exemplary embodiment, the actuator 602 may, for example, include a tractor, an ROV or another equivalent device. In an exemplary embodiment, the actuator 602 is capable of movement along the subsea riser 400, either autonomously, or by remote control from the ship 204. The heater 310 is coupled to the actuator 602 for heating fluidic materials within the body of water 206 proximate the heater. In this case, the heater may increase the maintenance touch time (i.e., the amount of time production equipment can be out of service until hydrates form). For example, the maintenance touch time can be automatically determined and then increased through chemical injection. In this example, the heater can extend the maintenance touch time if sufficient heat is applied.

In an exemplary embodiment, during the operation of the system 600, the actuator 602 is operated, as necessary, to position the heater 310 proximate a desired location along the subsea riser 400. Once the actuator 602 has positioned the heater 310 at a desired location along the subsea riser 400, the heater may then be operated to heat the fluidic materials within the body of water 206 proximate the subsea riser. In this manner, hydrates that may have formed within the interior of the subsea riser 400 at the desired location may be heated sufficiently to cause their removal from the interior of the subsea riser. Thus, the system 600 may continually move along the subsea riser 400, as needed, to prevent and/or eliminate the formation of hydrates within the subsea riser.

In an exemplary experimental embodiment, one of the heaters 114, 206, and 310 were tested to determine their survivability at extreme operating pressures as would be expected at undersea depths. In the exemplary experimental embodiments, a heater 114, 206, and 310 having a single 1.25 MW and 4 kV heating element had an electrical resistance of 276 ohms. In the exemplary experimental embodiments, a heater 114, 206; and 310 having fifteen (15) 1.25 kW and 4 kV heating elements was rated at 312.5 kW@4 kV, had phase to phase resistance/current of 111 ohms/43 Amps. In the exemplary experimental embodiments, a heater 114, 206, and 310 having sixty (60) 20.8 kW and 4 kV heating elements was rated at 1.25 MW@4 kV, had phase to phase resistance/current of 27.7 ohms/173 Amps.

Figure 7:
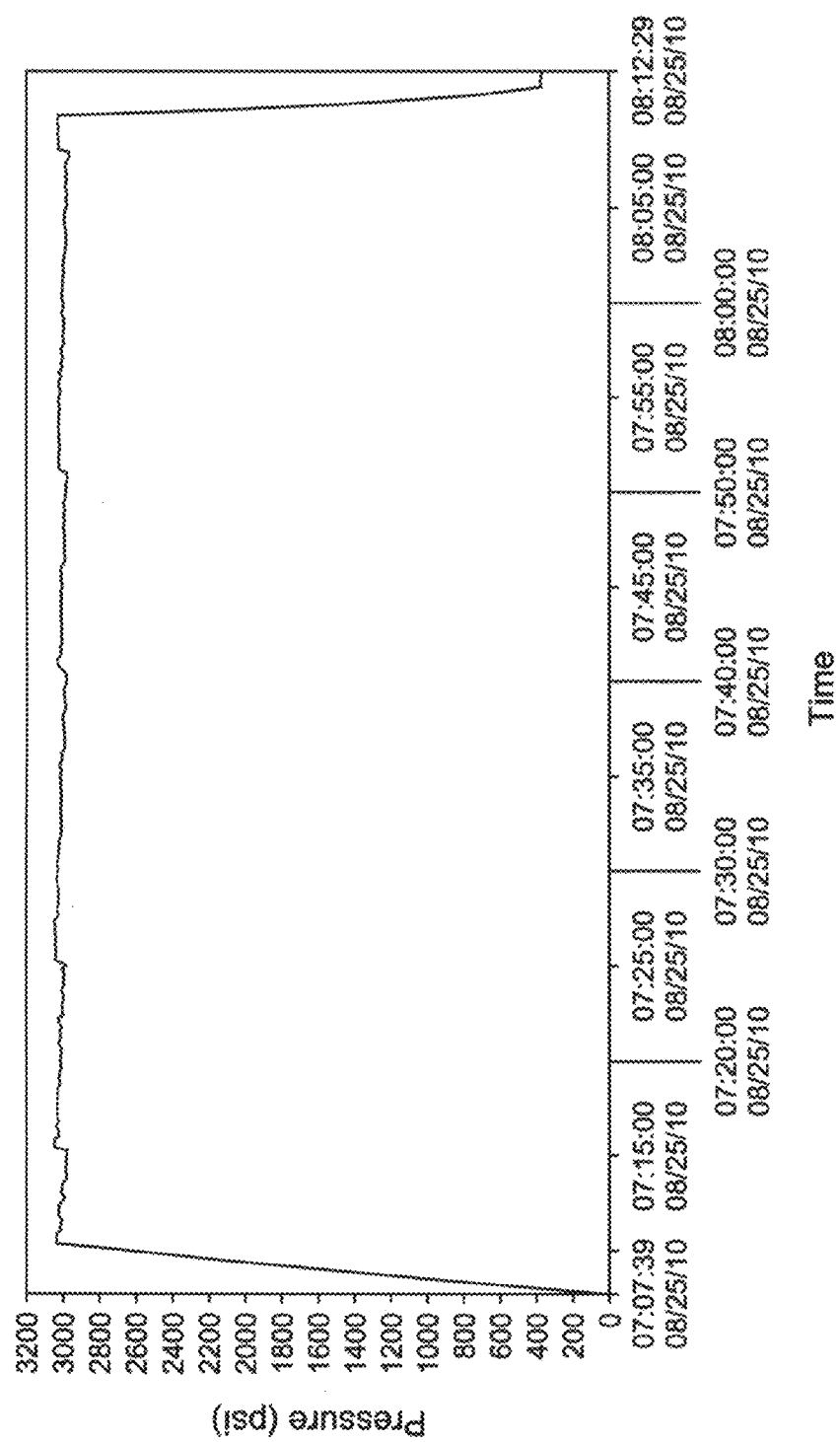
FIG. 7 is a graphical illustration of an exemplary experimental embodiment of an embodiment of the heaters of the exemplary embodiments.

In an exemplary experimental embodiment, as illustrated in FIG. 7, a heater 114, 206, and 310 having sixty (60) 20.8 kW and 4 kV heating elements was successfully operated within a pressure chamber submerged in water at 3000 psi for about one hour. This was an unexpected result.

Figure 8:
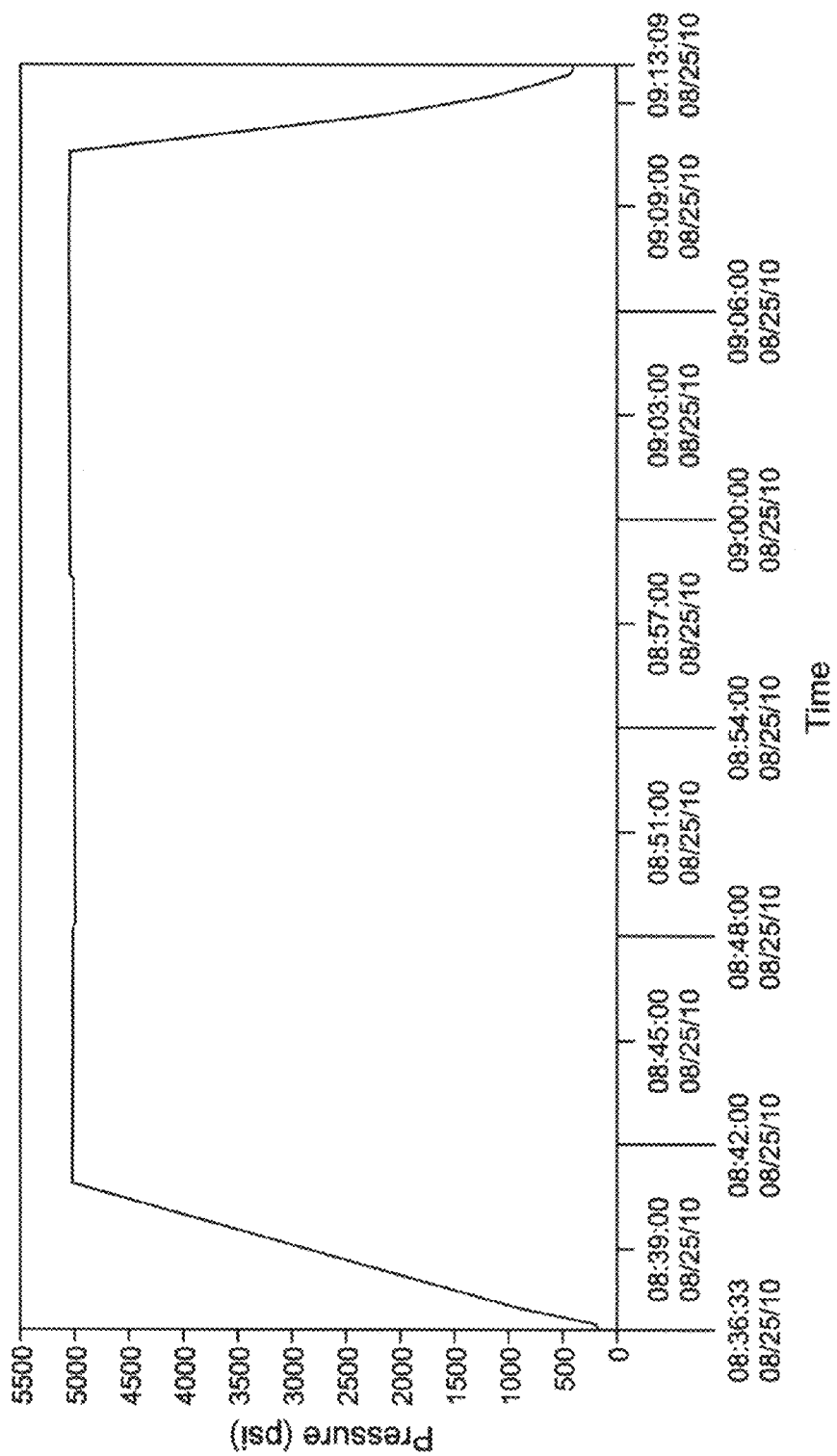
FIG. 8 is a graphical illustration of an exemplary experimental embodiment of an embodiment of the heaters of the exemplary embodiments.

In an exemplary experimental embodiment, as illustrated in FIG. 8, a heater 114, 206, and 310 having sixty (60) 20.8 kW and 4 kV heating elements was successfully operated within a pressure chamber submerged in water at 5000 psi for about forty five minutes. This was an unexpected result.

In an exemplary embodiment, one or more of the exemplary embodiments may also be operated to prevent and/or remove the formation of paraffins in subsea structures such as, for example, wellbore, pipelines, and risers.

An apparatus for preventing the formation of hydrates has been described that includes a housing defining an inner chamber and one or more openings; one or more heaters operably coupled to and positioned within the inner chamber of the housing; a controller operably coupled to the heaters for monitoring and controlling an operation of the heaters; and one or more sensors operably coupled to the controller and positioned within the inner chamber of the housing for sensing one or more operating conditions within the inner chamber of the housing; wherein the housing is adapted to operate in a subsea environment in depths exceeding about 100 meters. In an exemplary embodiment, one or more of the heaters comprise an operating voltage of at least about 2 kV. In an exemplary embodiment, the housing comprises at least a portion of a riser. In an exemplary embodiment, the housing comprises at least a portion of a subsea pipeline. In an exemplary embodiment, the housing comprises an open end that is sized to receive a blow out preventer of a subsea well. In other embodiments, the housing comprises an open end that is sized to receive a subsea leak source such as, but not limited to, a riser pipe leak, a production tieback leak, and a pipeline leak. In an exemplary embodiment, the heaters are adapted to increase an operating temperature of materials within the inner chamber of the housing from an operating temperature of about 35° F. to an operating temperature of about 85° F. In an exemplary embodiment, the housing is adapted to contain sea water. In an exemplary embodiment, the housing is adapted to contain natural gas. In an exemplary embodiment, the housing is adapted to contain a mixture of sea water and natural gas. In an exemplary embodiment, the housing is adapted to contain sea water having an operating pressure of up to about 2200 psig. In an exemplary embodiment, the housing is adapted to contain sea water having a mass flow rate of up to about 5000 lb/hr. In an exemplary embodiment, the housing is adapted to contain natural gas having an operating pressure of up to about 2200 psig. In an exemplary embodiment, the housing is adapted to contain natural gas having a mass flow rate of up to about 22 MMSCFD.

A method of heating hydrates within a defined volume at a location below a surface of a body of water has been described that includes heating the defined volume at the location below the surface of the body of water by immersing one or more heaters within the defined volume; and containing gaseous materials released from hydrate materials heated within and proximate to the defined volume. In an exemplary embodiment, one or more of the heaters comprise an operating voltage of at least about 2 kV. In an exemplary embodiment, the defined volume comprises at least a portion of a riser. In an exemplary embodiment, the defined volume comprises at least a portion of a subsea pipeline. In an exemplary embodiment, the defined volume comprises an open end that is sized to receive a blow out preventer of a subsea well. In other embodiments, the defined volume comprises an open end that is sized to receive a subsea leak source such as, but not limited to, a riser pipe leak, a production tieback leak, and a pipeline leak. In an exemplary embodiment, the heaters are adapted to increase an operating temperature of materials within the defined volume from an operating temperature of about 35° F. to an operating temperature of about 85° F. In an exemplary embodiment, the defined volume contains sea water. In an exemplary embodiment, the defined volume contains natural gas. In an exemplary embodiment, the defined volume contains a mixture of sea water and natural gas. In an exemplary embodiment, the defined volume contains sea water having an operating pressure of up to about 2200 psig. In an exemplary embodiment, the defined volume contains sea water having a mass flow rate of up to about 5000 lb/hr. In an exemplary embodiment, the defined volume contains natural gas having an operating pressure of up to about 2200 psig. In an exemplary embodiment, the defined volume contains natural gas having a mass flow rate of up to about 22 MMSCFD. In an exemplary embodiment, the method further comprises sensing one or more operating conditions within the chamber of the housing.

A system for extracting natural gas from hydrates has been described that includes a housing defining an inner chamber and one or more openings; one or more heaters operably coupled to and positioned within the inner chamber of the housing for heating hydrates within and proximate to the inner chamber of the housing to extract natural gas therefrom; a controller operably coupled to the heaters for monitoring and controlling an operation of the heaters; and one or more sensors operably coupled to the controller and positioned within the inner chamber of the housing for sensing one or more, operating conditions within the inner chamber of the housing; wherein the housing is adapted to operate in a subsea environment in depths exceeding about 100 meters.

A method of extracting natural gas from hydrates within a defined volume at a location below a surface of a body of water has been described that includes heating the defined volume at the location below the surface of the body of water by immersing one or more heaters within the defined volume to extract natural gas from hydrates within and proximate to the defined volume; and monitoring operating conditions within the defined volume at the location below the surface of the body of water.

An apparatus for heating fluidic materials at an underwater location has been described that includes an underwater actuator; a housing coupled to the actuator; and one or more heaters operably coupled to the housing for heating fluidic materials. In an exemplary embodiment, the apparatus further includes a motor having an output shaft coupled to the housing; and a propeller coupled to the output shaft of the motor positioned proximate one or more of the heaters. In an exemplary embodiment, one or more of the heaters comprise an operating voltage of at least about 2 kV. In an exemplary embodiment, the heaters are adapted to increase an operating temperature of fluidic materials from an operating temperature of about 35° F. to an operating temperature of at least about 85° F. In an exemplary embodiment, the actuator comprises an ROV. In an exemplary embodiment, the actuator is coupled to a fixed subsea structure. In an exemplary embodiment, the structure comprises a subsea pipeline. In an exemplary embodiment, the structure comprises a subsea riser.

A method of heating fluidic materials at a location below a surface of a body of water has been described that includes coupling one or more heaters to an actuator; displacing the heaters below the surface of the body of water by operating the actuator; and heating fluidic materials within the body of water by immersing the heaters in the body of water. In an exemplary embodiment, one or more of the heaters comprise an operating voltage of at least about 2 kV. In an exemplary embodiment, the actuator is coupled to at least a portion of a riser. In an exemplary embodiment, the actuator is coupled to at least a portion of a subsea pipeline. In an exemplary embodiment, the heaters are adapted to increase an operating temperature of fluidic materials from an operating temperature of about 35° F. to an operating temperature of about 85° F. In an exemplary embodiment, the sea water has an operating pressure of up to at least about 2200 psig. In an exemplary embodiment, the actuator comprises an ROV.

It is understood that variations may be made in the above without departing from the scope of the invention. While specific, embodiments have been shown and described, modifications can be made by one skilled in the art without departing from the spirit or teaching of this invention. The embodiments as described are exemplary only and are not limiting. Many variations and modifications are possible and are within the scope of the invention. Furthermore, one or more aspects of the exemplary embodiments may be omitted or combined with one or more aspects of the other exemplary embodiments. Accordingly, the scope of protection is not limited to the embodiments described, but is only limited by the claims that follow, the scope of which shall include all equivalents of the subject matter of the claims.

The invention claimed is:

1. An apparatus for heating hydrates at an underwater location, comprising:
   a housing selectively disposed on a sea floor above a wellbore and defining an inner chamber and one or more openings;
   one or more heaters operably coupled to and positioned within the inner chamber of the housing for heating materials therein and that each comprise a heating element that projects into the inner chamber and that operates at a voltage of at least about 2 kV when the housing is on the sea floor;
   a controller operably coupled to the heaters for monitoring and controlling an operation of the heaters; and
   one or more sensors operably coupled to the controller and positioned within the inner chamber of the housing for sensing one or more operating conditions within the inner chamber of the housing;
   wherein the heaters and the housing are adapted to operate in an underwater environment in depths exceeding about 100 meters.

2. The apparatus of claim 1, wherein the heaters connect to a transition line that extends subsea from above the sea surface.

3. The apparatus of claim 1, wherein the housing comprises at least a portion of a riser.

4. The apparatus of claim 1, wherein the housing comprises at least a portion of a subsea pipeline.

5. The apparatus of claim 1, wherein the housing comprises an open end that is sized to receive a blow out preventer of a subsea well or a subsea leak source selected from a group consisting of a riser pipe leak, a production tieback leak, and a pipeline leak.

6. The apparatus of claim 1, wherein the heaters are adapted to increase an operating temperature of materials within the inner chamber of the housing from an operating temperature of about 35° F. to an operating temperature of about 85° F.

7. The apparatus of claim 1, wherein the housing is adapted to contain sea water.

8. The apparatus of claim 1, wherein the housing is adapted to contain natural gas.

9. The apparatus of claim 1, wherein the housing is adapted to contain a mixture of sea water and natural gas.

10. The apparatus of claim 1, wherein the housing is adapted to contain sea water having an operating pressure of up to about 2200 psig.

11. The apparatus of claim 1, wherein the housing is adapted to contain sea water having a mass flow rate of up to about 5000 lb/hr.

12. The apparatus of claim 1, wherein the housing is adapted to contain natural gas having an operating pressure of up to about 2200 psig.

13. The apparatus of claim 1, wherein the housing is adapted to contain natural gas having a mass flow rate of up to about 22 MMSCFD).

14. The apparatus of claim 1, further comprising one or more sensors positioned within the chamber of the housing and operably coupled to the controller for generating signals representative of one or more operating conditions within the chamber of the housing.

15. The apparatus of claim 1, wherein one or more of the openings are provided along a side wall of the housing.

16. The apparatus of claim 1, wherein one or more of the openings are provided at an end of the housing.

17. The apparatus of claim 1, further comprising a cofferdam spaced above the sea floor and having an open lower end adapted to at least partially receive an end of the housing.

18. The apparatus of claim 17, further comprising a conduit operably coupled to the cofferdam for conveying fluidic materials therefrom.

19. The apparatus of claim 1, further comprising a conduit operably to the housing for conveying fluidic materials therefrom.

20. The apparatus of claim 1, wherein the heaters are adapted to operate submerged at operating pressures of up to about 3000 psi.

21. The apparatus of claim 1, wherein the heaters are adapted to operate submerged at operating pressures of up to about 5000 psi.

22. The apparatus of claim 1, wherein the heating element comprises a tube, a coil in the tube, a conductor pin connected to the coil that extends from the tube, an electrical insulation powder around the coil, an insulation plug in a cavity around the conductor pin and that seals the insulation powder, and an uncured dielectric liquid infiltrated at the cavity.

23. The apparatus of claim 1, wherein the housing projects radially outward past an outer radius of the wellbore.

24. A system for extracting natural gas from hydrates, comprising:
   a housing selectively disposed subsea on a sea floor above a wellbore, and defining an inner chamber and one or more openings;
   one or more heaters operably coupled to and positioned within the inner chamber of the housing for heating hydrates within and proximate to the inner chamber of the housing to extract natural gas therefrom, and that comprise heating elements that project into the inner chamber and that operate at a voltage of at least around 2 kV when the housing is disposed on the sea floor;
   a controller operably coupled to the heaters for monitoring and controlling an operation of the heaters; and
   one or more sensors operably coupled to the controller and positioned within the inner chamber of the housing for sensing one or more operating conditions within the inner chamber of the housing;
   wherein the housing is adapted to operate in a subsea environment in depths exceeding about 100 meters.

25. An apparatus for heating paraffins at an underwater location, comprising:
   a housing defining an inner chamber and one or more openings;
   one or more heaters operably coupled to and positioned within the inner chamber of the housing for heating materials therein, and that have heating elements that each project into the inner chamber and along a line that intersects a sidewall of the housing when the housing is subsea;
   a controller operably coupled to the heaters for monitoring and controlling an operation of the heaters; and
   one or more sensors operably coupled to the controller and positioned within the inner chamber of the housing for sensing one or more operating conditions within the inner chamber of the housing;
   wherein the heaters and the housing are adapted to operate in an underwater environment in depths exceeding about 100 meters.

* * * * *